April 10, 1928.                     F. W. MONTGOMERY                     1,665,558
                                        SPRING WHEEL
                                    Filed Jan. 22, 1925                  2 Sheets-Sheet 1
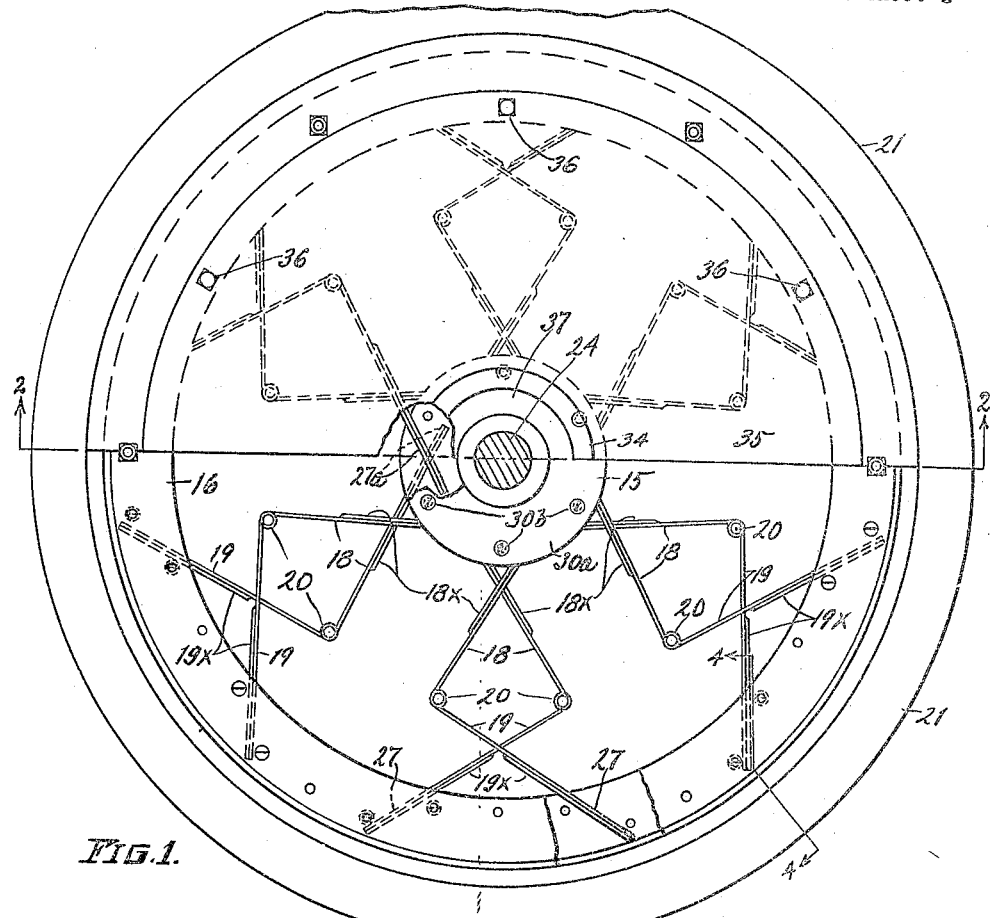
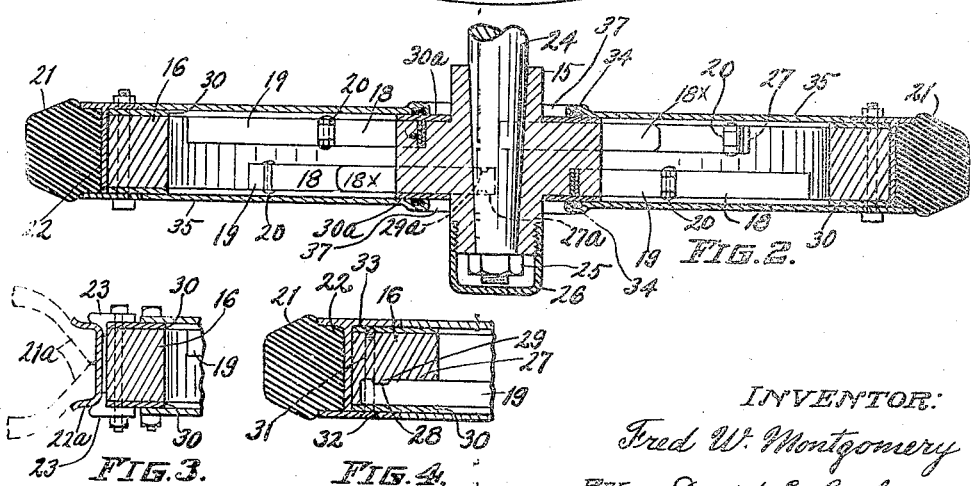
INVENTOR:
Fred W. Montgomery
BY David E. Carlsen
ATTORNEY.

April 10, 1928.  F. W. MONTGOMERY  1,665,558
SPRING WHEEL
Filed Jan. 22, 1925   2 Sheets-Sheet 2
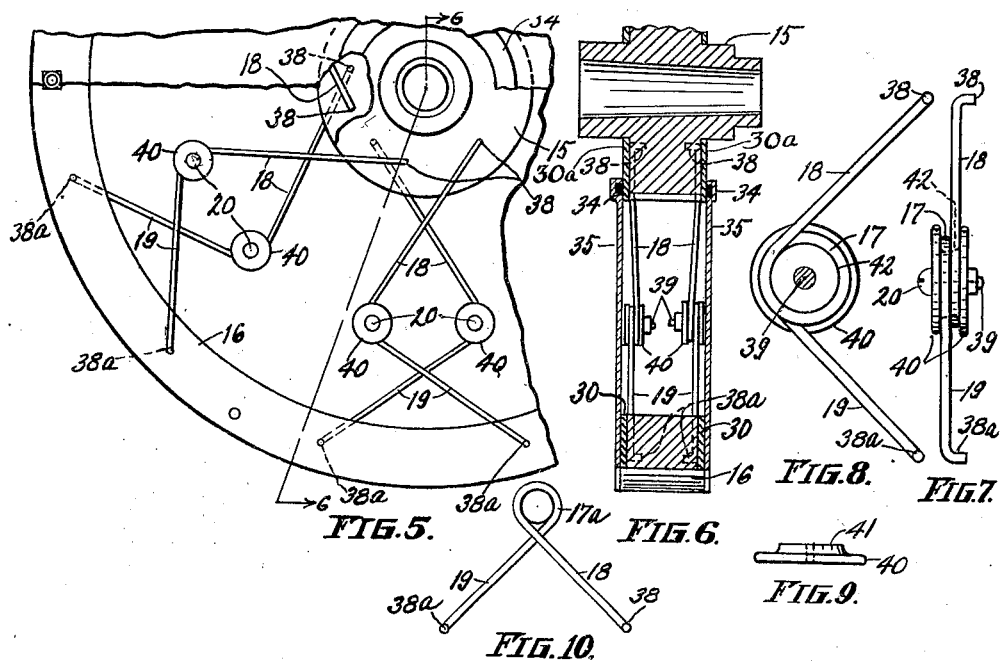
INVENTOR:
Fred W. Montgomery
BY David E. Carlsen
ATTORNEY.

Patented Apr. 10, 1928.

1,665,558

UNITED STATES PATENT OFFICE.

FRED W. MONTGOMERY, OF NORTH ST. PAUL, MINNESOTA.

SPRING WHEEL.

Application filed January 22, 1925. Serial No. 3,968.

My invention relates to spring wheels for automobiles and other vehicles and the object is to provide a supporting ground wheel with springs arranged in such an improved manner that they may dispense with tires, particularly pneumatic tires.

The underlying method of arranging the springs is the same in the variously modified forms shown in the accompanying drawings, in which:

Fig. 1 is a side elevation of a vehicle supporting wheel embodying my invention one of the side discs being partly broken away.

Fig. 2 is a section on the line 2—2 in Fig. 1.

Fig. 3 is a detail sectional view of the felly showing a modified form of the rim.

Fig. 4 is a section on the line 4—4 in Fig. 1.

Fig. 5 is a side elevation of a portion of the wheel with parts broken away and with the springs modified and tire omitted.

Fig. 6 is a section on the line 6—6 in Fig. 5.

Fig. 7 is an enlarged edge view of one of the springs in Fig. 5.

Fig. 8 is a right hand side view of Fig. 7 with one of the discs or washers 40 removed.

Fig. 9 is an edge view of either one of the discs in Fig. 7.

Fig. 10 is a side view of a further modification of the spring shown in Fig. 8.

Referring to the drawing by reference numerals, the wheel has a hub 15 and a felly 16 preferably of cast metal and connected by spring spokes of variously modified forms as will presently be fully described, but in all such forms each spoke consists of two members 18 and 19 joined together at 20 at about right angles and having the other ends rigidly secured one in the hub and the other in the felly.

The felly may have a solid rubber tire as 21 in Figs. 1, 2 and 4 or have no tire at all as in Figs. 5 and 6. Where a tire is used it may have a suitable rim as indicated at 22 in Figs. 2 and 4, or a demountable rim as 22ª in Fig. 3, held by clamps 23.

In Fig. 2 is shown an axle 24 with nut 25 normally covered by a suitable dust cap 26. In Fig. 4 is shown that the flat spring spokes have their outer ends 19 placed in grooves 27 in each side of the felly and provided each with a notch 28 engaging a rib 29 of the casting so as to resist extraction of the spoke which is held edgeways in said groove 27 by sheet metal ring 30 secured to the sides of the felly by bolts 31 having countersunk heads 32 and threaded at 33 into the opposite ring 30. The inner member 18 of each spoke is in like manner secured in a groove 27ª having a rib 29ª engaging a notch in the spring, and the latter is held in place by a ring 30ª secured to each side of the hub by screws 30ᵇ (see Fig. 1) having countersunk heads so as to leave the ring smooth for the slidable packing rings 34 formed integral with discs 35 secured one on each side of the felly by bolts 36 and having each a central aperture 37 to permit the hub to move when the spring spokes yield. The packing rings 34 and the discs 35 serve to keep dirt out of the interior of the wheel.

In Fig. 1 is shown that each spoke member may be reinforced by leaf springs 18ˣ and 19ˣ, and that each member is firmly held in a chordal direction either in the hub or in the felly, wherefore in operation the spokes make resistance to all downward pressure by the hub and axle, more so because only about half of such pressure is in lateral direction of the members, the other half being endwise against them.

In the modifications shown in Figs. 5 to 10 the resistance of the spring spokes is further increased by giving the joints 20 of the spoke members an integral spring coil 17 or 17ª which may be of the form shown in Figs. 5 to 8 or the simpler form shown in Fig. 10. In this case the spoke is preferably made of heavy spring wire and the ends formed with hooks 38, 38ª engaging in suitable depressions formed in the hub and the felly respectively. The coil 17 in Figs. 6, 7 and 8 is stiffened against lateral pressure by a bolt 39 and two washers 40 placed one at each side of the coil and having central embossments 41 (see Fig. 9) contacting with each other within the coil when drawn together by the bolt 39, thus leaving an annular groove 42 in which the spring coil may expand and contract freely. The hook-shaped ends of such spring spoke are held in place by rings 30 and 30ª and bolts 31 the same as in Figs. 1 and 2.

What I claim is:

1. In a spring wheel, a hub and a felly, said hub and felly having in their opposite sides a plurality of obliquely disposed grooves, a series of spokes arranged in pairs, each spoke comprising two members disposed at substantially right angles and connected at their inner ends, the outer ends of said members being engaged respectively with the grooves of the hub and felly, flat metal rings secured to the opposite sides of the hub and felly whereby the ends of the spokes are held against lateral movement from the grooves, and centrally apertured discs secured at their outer edges to the opposite sides of the felly, the centrally apertured portions of said discs having a sliding engagement with the plates on the opposite sides of the hub.

2. In a spring wheel, a hub and a felly, said hub and felly having in their opposite sides a plurality of obliquely disposed grooves, a series of spokes arranged in pairs, each spoke comprising two members disposed at substantially right angles and connected at their inner ends, the outer ends of said members being engaged respectively with the grooves of the hub and felly, flat metal rings secured to the opposite sides of the hub and felly whereby the ends of the spokes are held against lateral movement from the grooves, centrally apertured discs, said centrally apertured portions of the discs having annular recesses, and packing rings arranged in said recesses to form a dust tight engagement between the discs and hub plates.

3. In a spring wheel, a hub and a felly, said hub and felly having in their opposite sides a plurality of obliquely disposed grooves, ribs formed in the inner walls of said grooves, a series of spokes composed of two members arranged at substantially right angles and connected at their inner ends, the outer ends of said spoke members being engaged respectively with the grooves in the felly and hub and having notches to receive the ribs in said grooves whereby the ends of the spokes are held against retraction from the grooves and means whereby the ends of the spokes are held against lateral movement from said grooves.

4. In a spring wheel, a hub and a felly, said hub and felly having in their opposite sides a plurality of obliquely disposed grooves, ribs formed in the inner walls of said grooves, a series of spokes composed of two members arranged at substantially right angles and connected at their inner ends, the outer ends of said spoke members being engaged respectively with the grooves in the felly and hub and having notches to receive the ribs in said grooves whereby the ends of the spokes are held against retraction from the grooves, flat metal rings secured to the opposite sides of the hub and the felly whereby the ends of the spokes are held against lateral movement from the grooves, and centrally aperture discs secured at their outer edges to the opposite sides of the felly, the centrally apertured portions of said discs having a sliding engagement with the plates on the opposite sides of the hub.

In testimony whereof I affix my signature.

FRED W. MONTGOMERY.